United States Patent
Burkhard et al.

[15] 3,681,531
[45] Aug. 1, 1972

[54] DIGITAL DELAY SYSTEM FOR AUDIO SIGNAL PROCESSING

[72] Inventors: Mahlon D. Burkhard, Hinsdale; Richard W. Peters, Algonquin, both of Ill.

[73] Assignee: Industrial Research Products, Inc., Elk Grove Village, Ill.

[22] Filed: Sept. 4, 1970

[21] Appl. No.: 69,524

[52] U.S. Cl. ....................179/1 J
[51] Int. Cl. ....................H04r 3/00
[58] Field of Search .......179/1 J, 15.55 R, 100.2 RE, 179/15 A; 333/30 M; 181/27 A; 328/55, 56

[56] References Cited

UNITED STATES PATENTS 3,376,387 4/1968 Cassel....................179/1 SA
3,095,482 6/1963 Whiteford....................179/1 J

*Primary Examiner*—Kathleen H. Claffy
*Assistant Examiner*—Douglas W. Olms
*Attorney*—Kinzer, Dorn and Zickert

[57] ABSTRACT

A plural sound delay system for use in sound reinforcement in auditoria and in other applications, comprising a digital encoding system for converting an analog audio signal to digital form, a progressive digital data store for storing the digital signal, plural readout means for reading data from the store after any one of a plurality of different storage intervals, and at least one decoding system for regenerating a delayed audio analog signal from one of the digital readouts.

9 Claims, 3 Drawing Figures

INVENTORS
MAHLON D. BURKHARD
RICHARD W. PETERS
BY
Kinzer, Dorn + Zickert
ATTORNEYS

DIGITAL DELAY SYSTEM FOR AUDIO SIGNAL PROCESSING

BACKGROUND OF THE INVENTION

There are many uses for an audio-frequency delay system which can provide faithful reproduction of an audio signal, such as speech or music, at a fixed time interval after the sound has been generated. Very short delays of a few milliseconds and long delays of up to 1 or 2 seconds are required in different experimental and practical situations. For example, in laboratory study of inter-aural delay effects and their relation to the theory of hearing, delays of the order of 15 to several hundred milliseconds are useful. As another example, it is known that significant improvement in the quality of sound reinforcement or reproduction is achieved when the amplified sound emitted by loudspeakers located in an auditorium is delayed by a time equal to the time of transit of the sound from the source to the speaker location.

The methods used to accomplish such delays have changed little since the time of Bascom U.S. Pat. No. 1,358,053. The audio signal is recorded temporarily on a suitable medium, such as a magnetic tape loop, and is detected soon thereafter. The time delay depends on the spacing between the recording and playback heads and the speed of the tape. Several playback heads can be used for different delays. This method of time delay has been used almost exclusively since World War II, when the technology of magnetic recording was perfected sufficiently to provide adequate dynamic range and a frequency response bandwidth acceptable for quality sound reinforcing systems. Typical systems use a loop of magnetic tape driven mechanically at a uniform speed of 30 inches per second, with one magnetic recording head and one or more magnetic pickups.

A virtue of the tape loop delay system is that the output signal level is independent of delay time; thus, equalization of frequency response is constant for all delays. But this type of delay equipment must have regular maintenance. For example, typical tape loops must be replaced at 10 hour intervals of use, or oftener, to maintain acceptable quality. The magnetic recording heads must be regularly cleaned and re-positioned. The bearings and drive mechanism of the tape recorder must be regularly serviced to maintain reliable performance. This servicing and maintenance requirement is expensive and requires special training. The equipment cannot be operated continuously with impunity, since the performance deteriorates in proportion to cumulative operating time. While somewhat longer life and lower maintenance cost could be obtained if the tape were operated at a slower speed, a slow speed does not permit close enough spacing for the pickup heads to obtain the small time delay often required for practical use of the system.

It has also been known for many years that delays can be accomplished by networks of appropriately connected inductors and capacitors. Mills U.S. Pat. No. 1,647,242, describes the use of a sound delay system or reverberation system employing such networks. Such systems are bulky and expensive, when used in the audio frequency range, and hence have not been considered practical for audio frequency delays.

Recently, time delay systems for auditorium use based on propagation through a closed tube have been used, with delays in the range of 50 to 100 milliseconds; see *Tappan, Journal Audio Engineering Society*, Vol. 17, p. 80 (1969). *Neubauer, Journal of the Acoustical Society of America*, Vol 37, p. 1139 (1965), describes an arrangement of this kind in a different environment. A tube of a length approximately equal to the dimensions of the auditorium is fitted at one end with a quality loudspeaker or horn driver and at the other end with a "perfect" sound absorber. One or more quality microphones are placed at locations along the tube remote from the sound source to obtain delayed sound. This type of sound delay equipment is limited in use because the sound wave suffers attenuation that is proportional to the square root of the frequency, proportional to the delay time, and inversely proportional to the tube diameter. The amplitude of signal at the sound source and the delay times must be correlated so that an adequate signal-to-noise ratio is maintained at the output. The tube must be carefully mounted to prevent vibration of the microphones, which reduces the effective dynamic range of the equipment.

Still another limitation to the use of tube delay systems is the amplitude dependence of sound propagation velocity and attenuation, for large signals. Thus, signal amplitudes must be kept below a well defined value, further restricting the dynamic range of operation. As a practical matter, delays longer than approximately 50 milliseconds are not feasible. Mounting spaces for such a system are often not conveniently available. Also, once installed, time delays cannot readily be adjusted. In tuning or adjusting a sound reinforcing system in a particular auditorium, it is frequently desirable to have flexibility in adjusting both the time delay and the amplitude for a particular loudspeaker.

SUMMARY OF THE INVENTION

The delay equipment of the present invention avoids these difficulties in that it is all "solid state" and requires no moving parts; servicing requirements are virtually eliminated. The delay system of the invention may be installed as conveniently as any conventional electronic equipment. The invention affords flexibility in adjustment of delay pickup times; moreover, it provides for delay of audio-frequency signals ranging from the very short times required for experimental work to the long delays required for improved sound reinforcing systems or unusual experimental conditions. The spectrum and signal level do not change with delay time.

The invention relates to a digital delay system for audio signal processing that is adapted for use in sound reinforcement in auditoria and other applications in conjunction with an audio signal source and one or more audio reproducers. The system comprises an analog-digital converter, coupled to the audio signal source, that converts an analog audio signal received from the source into a digital data signal. A digital data store is coupled to the analog digital converter and is utilized to store the digital data signal. Output means are provided for the digital data store, for reading the digital data signal from the store at any one of a plurality of different delay intervals subsequent to recording.

One or more digital-analog converters are coupled to the data store output means and are utilized to develop a delayed representation of the analog audio signal. Each digital-analog converter is connected to at least one audio reproducer to develop a delayed audible reproduction of the original analog signal.

DESCRIPTION OF THE PREFERRED EMBODIMENTS

Figures 1, 2, 3:
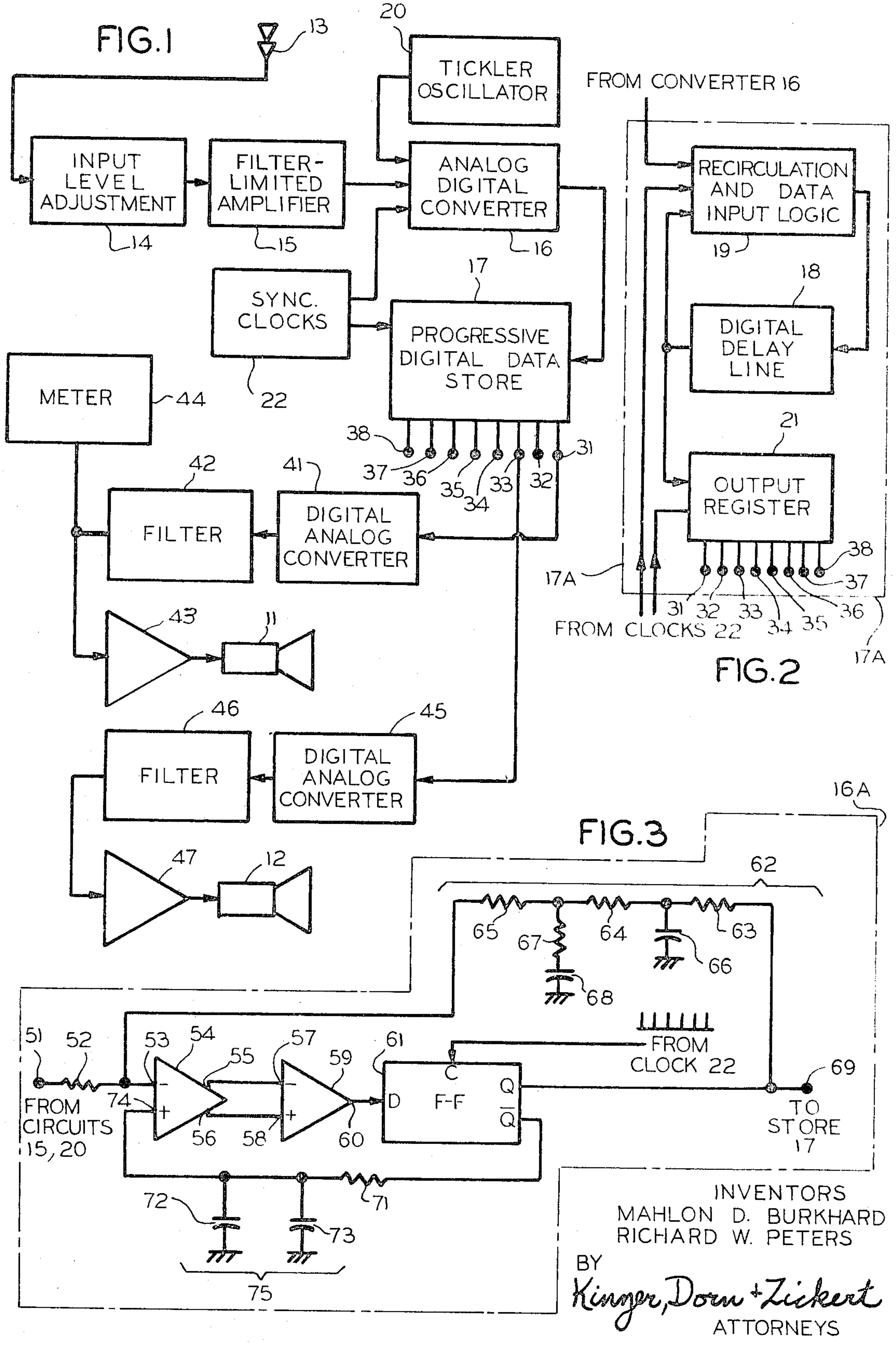
FIG. 1 is a block diagram of a digital delay system for audio signal processing constructed in accordance with one embodiment of the present invention.
FIG. 2 is a block diagram of another form of storage unit usable in the system of FIG. 1.
FIG. 3 is a schematic diagram, partly in block form, of a preferred form of analog-digital converter utilized in the system of FIG. 1.

FIG. 1 illustrates a digital delay system 10 for audio signal processing, adapted for use in sound reinforcement in auditoria and in other applications. System 10 is utilized to supply driving signals to at least two speakers 11 and 12 to produce an audible reproduction of sound originating at or near an audio signal source 13. The audio signal source 13 is illustrated as a microphone but could constitute a phonograph, tape recorder or other source of recorded audio signals. On the usual situation, microphone 13 is located on a stage and the speakers 11 and 12 are placed a substantial distance from the stage, within an auditorium, in position to reinforce the sound originating at the location of the microphone. As pointed out above, intelligible reproduction requires a reasonable match between the time delays for the system coupling the microphone 13 to speakers 11 and 12 and the atmospheric transmission delay for sound traversing the open auditorium to each speaker location.

The input of system 10 includes a level adjustment unit 14 to which microphone 13 is connected. The output of circuit 14 is connected to a pre-emphasis filter, limiter, and amplifier circuit 15, which is in turn coupled to the input of an analog-digital converter 16 driven and synchronized by a synchronizing clock unit 22. A "tickler" oscillator 20 may also be connected to the input of converter 16. Theoretically, converter 16 could constitute any circuit for converting an analog signal to digital form. As a practical matter, pulse code modulation and delta modulation circuits are preferred for converter 16. Preferred types of analog-digital converters are discussed more fully hereinafter.

The output of the analog-digital converter 16 is connected to the input of a progressive digital data storage unit 17. Digital data store 17 comprises a storage device that can retain the stored data for a substantial period of time (e.g., 100 milliseconds) while permitting continuous addition to and deletion from the stored data, at the beginning and end of the recorded message, and readout of the data at several delay intervals short of the maximum delay. The term "progressive digital data store" is used herein to designate a storage unit with this capability. One particularly advantageous type of progressive digital data store, for use as the store 17, is a semiconductor solid state shift register, having a plurality of output taps such as the taps 31–38. The shift circuits of register 17 are actuated from clock unit 22. Another form of data storage unit 17A, illustrated in FIG. 2, however, uses a delay line and specifically an ultrasonic torsional delay line 18. Delay line 18 has an input end connected to a recirculation and data input logic circuit 19, to which the digital data signal from converter 16 is supplied. The output of delay line 18 is connected back to the logic circuit 19 and is also connected to an output register 21. Register 21 and logic circuit 19 are both supplied with synchronizing signals from the same clock unit 22 that is also connected to the converter 16 to control the bit rate of the converter operation.

The output register of the digital data store 17A has a series of individual taps or terminals 31–38 corresponding to the taps or register 17. Each of these taps affords a means for reading the digital data signal from store 17A at one of a plurality of distinct delay intervals. In a typical installation, for example, the delay interval for terminal 31 may be 12.5 milliseconds and the difference between each two adjacent taps may be 12.5 milliseconds, giving a total delay for the storage unit, at the last terminal 38, of 100 milliseconds.

The first output terminal 31 for the progressive digital data store 17 (or store 17A) is connected to a digital-analog converter 41. Converter 41 is utilized to re-convert the digital signal that it receives from register 21 to an analog form. That is, the output of digital-analog converter 41 is, essentially, a re-generation of the original analog audio signal from microphone 13, but with a delay of 12.5 milliseconds.

The delayed representation of the analog audio signal, from converter 41, is applied to a post-emphasis filter 42. The output of filter 42 is supplied to an amplifier 43 that actuates speaker 11. A meter 44 may be connected to the output of filter 42 to provide for monitoring the calibration of the output as supplied to speaker 11.

In many applications, more than one reinforcing speaker will be utilized. For a second speaker, located farther back in the auditorium from the microphone 14 than speaker 11, system 10 includes a second digital-analog converter 45 shown connected to the third output terminal 33 of register 21. Converter 45 receives the stored digital data signal after a time delay of 37.5 milliseconds. It converts that signal to analog form. The signal is then supplied to a post-emphasis filter 46 and to an amplifier 47 that drives the second speaker 12.

As noted above, there are a number of different known methods for converting analog signals into digital signals. One form of converter that may be utilized as the analog digital converter 16 is a pulse code modulator. Pulse code modulation is attractive for broad band flat spectrum signals or for applications in which there is no preliminary indication of the spectral characteristics of the signal to be processed. In a digital delay system such as system 10, using a pulse code modulator as converter 16, the sampling rate is usually selected at a frequency equal to twice the highest frequency expected in the audio signal. Each sample is encoded, according to its amplitude, into a binary number. For good reproduction, this binary number must have eight or more digits. A total of $2^8$ amplitude levels provides satisfactory fidelity in the reproduction of speech or music if the quantising levels are distributed on a non-linear basis throughout the range of amplitudes expected.

Pulse code modulation, employing the described techniques, affords quite satisfactory operation. However, the operating circuits for converter 16, on the basis of pulse code modulation, are relatively complex. Moreover, the decoding or reconversion circuits required for converters 41 and 45, when pulse code modulation is employed, tend to be rather complex. A somewhat simpler and less expensive system, utilizing delta modulation for the conversion from analog to digital form, is preferred.

In a delta modulation analog-digital converter, an analog audio signal is sampled at a rate that is high compared to the highest frequency in the audio signal. The instantaneous amplitude of each sample is compared with a "replica" of the immediately preceding samples. If the instantaneous amplitude of the latest sample is larger than the replica of the amplitude of prior samples, the unit of positive voltage corresponding to a binary 1 is generated. Conversely, if the instantaneous amplitude of the current sample is smaller than the replica of prior samples, a voltage corresponding to a binary zero is generated. Thus, by successive samples a series of ones and zeros are generated to afford a digitally encoded version of the analog input signal. The "replica" used for comparison with successive samples, in the delta modulator, is derived from the bit stream by averaging the value of the bit stream with a conventional RC network or other category. For each succeeding sample, the stream of zero and one signals represents deviations between the incoming analog signal and the result of the delta modulation or digitizing process.

Conventional delta modulator circuits can be used for converter 16. However, a preferred converter circuit 16A is illustrated in FIG. 3. Converter 16A has an input terminal 51 that receives input signals from circuits 15 and 20 and is connected through an input resistor 52 to the inverting input terminal 53 of a high gain differential amplifier 43. Amplifier 54 has two output terminals 55 and 56 connected to the inverting and non-inverting inputs 57 and 58, respectively, of a comparator amplifier 59. Amplifiers 54 and 59 are both solid state integrated circuit devices; in a typical arrangement, amplifier 54 may be a type CA 3001 amplifier and amplifier 59 may comprise a type 710–C comparator amplifier.

The output of comparator 59 is coupled to the D input of a Type D sampling flip-flop circuit 61. Preferably, flip-flop 61 is a solid state integrated circuit device; for example, a Type SN7474N flip-flop can be used. The C input of circuit 61 is connected to the synchronizing clock source 22.

Flip-flop circuit 61 has its Q output connected to a principal feedback loop 62. This feedback loop comprises, in series, three resistors 63, 64, and 65, resistor 65 being connected to the inverting input 53 of amplifier 54. The common terminal of resistors 63 and 64 is connected to a capacitor 66 that is returned to system ground. The common terminal of resistors 64 and 65 is connected to a resistor 67 that is in turn connected to a capacitor 68 that is returned to ground. The Q output of flip-flop circuit 61 is also connected to the output terminal 69 for the delta modulator 16A.

The $\overline{Q}$ output of flip-flop circuit 61 is connected to a second feedback circuit 75 comprising a series resistor 71. Resistor 71 is connected to the non-inverting input terminal 74 of amplifier 54. Two capacitors 72 and 73 are connected from terminal 74 to ground.

In the operation of the delta modulator circuit 16A of FIG. 2, the input analog signal is supplied to terminal 51 and, through resistor 52, to the inverting terminal 53 of the high gain comparator circuit comprising amplifiers 57 and 59. The comparison is made with a replica of the output signal derived from the Q terminal of flip-flop 61, as supplied by the double integral feedback circuit 62. The flip-flop circuit 61 provides clocking and sampling control to generate the data stream, with its frequency being controlled by the clock signal from source 22.

In the conventional delta modulator, the reference used for comparison in circuit 54,59 is usually a fixed voltage derived from a power supply. In circuit 16A, however, the reference is developed by the second feedback loop 75. That is, the feedback circuit 75 from the $\overline{Q}$ terminal of flip-flop 61 to the non-inverting terminal 74 of amplifier 54 affords a self-bias or self-generated reference for the comparison function.

In operation, the second feedback circuit 75 serves as a low pass filter which maintains a D.C. voltage, on the non-inverting input 74 of amplifier 54, that effectively bucks the D.C. part of the voltage from the first feedback circuit 62 that is connected to the inverting terminal 53 of amplifier 54. This effectively cancels the offset voltages generated in the comparator amplifier 53,59 and in flip-flop 61 without treating these offsets as spurious input signals.

The "tickler" oscillator 20 applies a continuous low-level signal, outside of the audio range, to converter 16. This "tickler" signal may be in the sub-audio range (e.g., about 30 hz.) or may be at an ultrasonic frequency. The tickler signal serves to reduce the subjective noise of converter 16 by maintaining the converter in continuous operation with an input always present, rather than allowing the converter to idle, which could introduce subjectively objectionable effects. The tickler signal can be effectively eliminated in the output stages of system 10, in filters 42, 46, etc.

A delta modulator, and particularly the delta modulator 16A of FIG. 2, is especially attractive for use in delay systems for sound reinforcement in auditoria and the like because of the economical reconversion to analog form that is possible with this form of modulation. In particular, where a delta modulator is utilized for converter 16, the reconversion units 41 and 45 are simple integration or averaging circuits; that is, demodulation is attained by simple integration or averaging of the resulting streams of zeros and ones. The integration network in the demodulator is essentially identical to that in the modulator.

The characteristics of delta modulation, as applied to the digital encoding of audio signals, are well suited to both music and speech processing. For a rapidly changing signal the delta modulator encoding operation lags behind the signal, producing a distorting in the reconstituted analog signal. This form of distortion is known as slope overload distortion, and limits the effective high frequency amplitude response that can be tolerated. However, both speech and music have lower amplitudes at high frequencies, as compared to low frequencies. As a consequence, the tendency of the delta modulator toward slope overload distortion is not a substantial deficiency in a well-designed system.

Refinements in the delta modulation process are possible by use of compression and expansion schemes. Basically, for compression and comparator is modulated on the basis of the magnitude of the error between the "replica" signal and the input signal. The system must be so arranged that information as to the discrimination level is transmitted with the digital data signal. The decoding or demodulating equipment then regenerates the signal by developing the appropriate complement of the error information. This means that the demodulating portion of the system is somewhat more complicated, adding to the overall cost of equipment. This consideration is especially important in applications where the delay system must have several taps representing different delays, as in a practical auditorium installation, or when used to generate artificial reverberation.

An alternative is to apply compression-expansion systems directly to the analog signal, both at the input and at the output. Thus, in the illustrated system amplifier 15 may be constructed to afford a transfer function that is non-linear with respect to amplitude, affording a controlled overload characteristic which is subjectively more acceptable than if an overload is permitted in delta modulator 16. There are a number of techniques of this general nature that may be utilized, including non-linear amplifiers, variable gain amplifiers with gain determined by the average amplitude of the signal, and combinations of these. This feature may also add to the cost of the overall system in proportion to the number of time delay taps to be provided, depending upon the particular technique adopted.

Still another way to improve the dynamic range or signal-to-noise ratio is to increase the sampling rate of the delta modulator. This also will result in a net increase in the cost of a delay system, in that a larger storage is required for a given unit of time delay. The selection of a particular means of maintaining quality in such a time delay system is dictated primarily by economic considerations. If the cost of added increments of time delay is relatively low, it is preferable to use a high sampling rate, because the method of modulation and demodulation will be relatively straightforward and will have the least cost per time delay tap. On the other hand, if the cost of increments of time delay is large than it is preferable to use compression-expansion techniques because relatively more incremental cost can be absorbed in the individual tap points without adding excessively to the total cost of the equipment.

At the present time, the most economical basic storage unit for store 17 appears to be an ultrasonic torsional delay line (delay line 18). Such a line usually consists of a coiled wire which is excited torsionally. The delay line offers delays according to the propagation time of a wave from an input transducer at one end of the line to an output transducer at the other end. Storage and delay of a large number of bits is accomplished by a recirculation technique.

Using a torsional delay line in a recirculation mode, in a typical installation, a basic input frequency of the order of 2.0 megahertz may be selected. The delta modulator can then be operated at a sampling frequency of approximately one-eighth of the signal frequency on the delay line. Thus, there are eight sample spaces into which signals from the delta modulator may be entered on the delay line. The signal is recirculated on the line eight times and at the end of eight cycles one of the bits is dumped and a new bit is entered. Thus, a line having a 12.5 millisecond total transit time from one end to the other for the ultrasonic wave can store up to 100 milliseconds of audio frequency information. The audio frequency is available for use every 12.5 milliseconds. Time delays of the order of 25 milliseconds separation are satisfactory for typical auditorium installations; adjustment to 12.5 milliseconds for the relative tap positions is desirable. If delays greater than 100 millisecond are required, additional torsional ultrasonic delay lines may be connected serially, up to several seconds of total delay, without substantial degradation of performance.

If the delay line is operated with a frequency of 2.0 megahertz, the sampling rate of the delta modulator may be 250 kilohertz. Oscillators are used to provide both the sampling rate and the frequency drive on the delay line and these are interlocked with synchronizing circuits to assure stability. A system of better dynamic range is obtained if the delta modulator is operated at a sampling rate of 333 kilohertz. In this case, the same delay line affords 75 milliseconds of delay per section.

An alternative means of providing storage and time delay comprises one or more semiconductor solid state shift registers. A particularly attractive shift register is the metal oxide silicon type. The advantage of either type of delay system is that the signal, having been coded into digital or binary form, can be stored for a time as long as needed simply by adding additional elements. The storage elements are small and do not require large volume. In addition, they are semipassive in nature, i.e., they do not have any moving or mechanical parts that can wear out or that require servicing.

A shift register store is preferred, from many aspects. It offers smaller size, conservation of electrical power, and freedom from external interferring noise signals, which may offer problems with an electromechanical delay line. Shift register signal storage is likely to be more attractive in the future as technological advances provide more economical production of these elements. At present, it is economically competitive for delays of a few milliseconds.

For shift register delay systems, a single oscillator provides the clocking signal for the shift register and for the sampling frequency of the delta modulator or other analog-digital converter. An advantage of the shift register is that the clock oscillator frequency can be and has been used to adjust time delays.

For the delta modulator 16A, FIG. 3, using the integrated circuit components and operating frequencies identified above, suitable components are as follows:

| | |
|---|---|
| | Resistors |
| 63, 64 | 2.2 kilohms |
| 65, 71 | 10 kilohms |
| 67 | 270 ohms |
| | Capacitors |
| 66 | .22 microfarads |
| 68 | .033 microfarads |
| 72 | .01 microfarads |
| 73 | 100 microfarads |

We claim:

1. A digital delay system for audio signal processing, adapted for use in sound reinforcement in auditoria and other applications, for use with an audio signal source and at least one audio reproducer, comprising:

an analog-digital converter, coupled to an audio signal source, for converting an analog audio signal received from the source into a digital data signal;

a digital data store, coupled to said analog-digital converter, for recording said digital data signal;

output means for said digital data store, for reading the digital data signal from the store at any one of a plurality of different delay intervals subsequent to recording;

at least one digital-analog converter, connected to said data store output means, for developing a delayed representation of the analog audio signal;

and means coupling said digital-analog converter to said audio reproducer to develop a delay audible reproduction of the initial analog audio signal.

2. A digital delay system for audio signal processing, according to claim 1, in which said analog-digital converter is a delta modulator and which includes a plurality of digital-analog converters, each coupled to at least one audio reproducer.

3. A digital delay system for audio signal processing, according to claim 2, in which each digital-analog converter comprises an integrator having operating characteristics substantially the same as a main integrator circuit included in said delta modulator.

4. A digital delay system for audio signal processing, according to claim 1, in which said analog-digital converter is a delta modulator comprising:

a high-gain comparator amplifier having an inverting input and a non-inverting input, and an output;

means for applying an analog signal to the inverting input of said comparator amplifier a sampling gate having an input connected to the output of said comparator amplifier and having a main output and an auxiliary output; the inverting input of said comparator means for applying a high-frequency sampling signal to said sampling gate to actuate said gate between said alternate outputs;

an integrating negative feedback circuit connected between said main sampling gate outputs and said inverting input of said comparator amplifier, for developing a replica signal and for applying that replica signal to the inverting input of the comparator amplifier in bucking relation to said analog signal, for amplitude comparison therewith;

and an auxiliary feedback circuit, connected between the auxiliary output of the sampling gate and the non-inverting input of the comparator amplifier, for affording a self-bias reference for the comparator amplifier and effectively eliminating any offset voltages generated in the comparator amplifier and the sampling gate.

5. A digital delay system for audio signal processing, according to claim 1, in which said analog-digital converter is a pulse code modulator and which includes a plurality of digital-analog converters, each coupled to at least one audio reproducer.

6. A digital delay system for audio signal processing, according to claim 1, in which said digital data store comprises an integrated circuit shift register and said output means comprises a series of spaced taps at different stages along that register.

7. A digital delay system for audio signal processing according to claim 6, including means for applying synchronized clock signals to said analog-digital converter and to the shift circuits of said shift register to control the sampling rate for digital conversion and the rate of transfer of data along the shift register, respectively, with provision for adjusting the clock signal frequencies to adjust the time delays at said taps on the shift register.

8. A digital delay system for audio signal processing, according to claim 1, in which said digital data store comprises a sonic delay line.

9. A digital delay system for audio signal processing, according to claim 8, in which said delay line is operated in a recirculation mode, with the data recorded therein recirculated a fixed number of cycles and with a predetermined number of data bits replaced in each cycle.

* * * * *